United States Patent
Craig et al.

(10) Patent No.: US 7,876,368 B2
(45) Date of Patent: Jan. 25, 2011

(54) SLIMMING EFFECT FOR DIGITAL PHOTOGRAPHS

(75) Inventors: Murray Dean Craig, Johnstown, CO (US); Robert P. Cazier, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 952 days.

(21) Appl. No.: 11/550,151

(22) Filed: Oct. 17, 2006

(65) Prior Publication Data

US 2008/0088712 A1    Apr. 17, 2008

(51) Int. Cl.
*H04N 5/262* (2006.01)
*H04N 9/74* (2006.01)
*G03B 21/32* (2006.01)

(52) U.S. Cl. .................. 348/239; 348/578; 352/85

(58) Field of Classification Search .............. 352/44, 352/85, 91 C, 91 R; 348/207.99, 239, 595, 348/576, 578, 277, 286, 298; 382/293, 298, 382/299

See application file for complete search history.

(56) References Cited

U.S. PATENT DOCUMENTS

| | | | | |
|---|---|---|---|---|
| 5,263,136 A | * | 11/1993 | DeAguiar et al. | 345/538 |
| 5,666,552 A | * | 9/1997 | Greyson et al. | 715/210 |
| 6,680,749 B1 | * | 1/2004 | Anderson et al. | 348/231.99 |
| 7,106,911 B2 | | 9/2006 | Ohta et al. | |
| 7,116,832 B2 | | 10/2006 | Bruna et al. | |
| 7,391,932 B2 | * | 6/2008 | Jeon | 382/298 |
| 2004/0039934 A1 | * | 2/2004 | Land et al. | 713/200 |
| 2004/0080621 A1 | * | 4/2004 | Fisher et al. | 348/207.99 |
| 2005/0001933 A1 | * | 1/2005 | Yoshikawa et al. | 348/564 |
| 2005/0093891 A1 | * | 5/2005 | Cooper | 345/649 |
| 2006/0078227 A1 | * | 4/2006 | Chang et al. | 382/298 |
| 2008/0056364 A1 | * | 3/2008 | Lyashevsky et al. | 375/240.13 |
| 2008/0063303 A1 | * | 3/2008 | Strom et al. | 382/298 |

OTHER PUBLICATIONS

Dpreview, "Camera Adds Slimming Effect, Makes Girlfriend Happy", Apr. 9, 2006.*
Dpreview_2, "HP slimming effect" for fat people, Sep. 19, 2006.*
Biztoolbelt, HP Photsmart R927 digital camera offers slimming feature, Jun. 14, 2006.*
Adobe_CS2, Pub. Date Jan. 1, 2005 by David Busch.*
Microsoft Paint copyright 2001-2005.*

* cited by examiner

*Primary Examiner*—Lin Ye
*Assistant Examiner*—Euel K Cowan

(57) ABSTRACT

Systems and methods are disclosed for applying a slimming effect to a subject in a digital image on a camera. An exemplary method may comprise compressing the digital image in one dimension so that a subject appears thinner. The method may also comprise selecting a portion of the compressed image on both sides of the subject. The method may also comprise stretching only the selected portion of the compressed image to retain an aspect ratio of the original digital image.

24 Claims, 6 Drawing Sheets

SLIMMING EFFECT FOR DIGITAL PHOTOGRAPHS

BACKGROUND

Conventional film and more recently, digital cameras, are widely commercially available, ranging both in price and in operation from sophisticated single lens reflex (SLR) cameras used by professional photographers to inexpensive "point-and-shoot" cameras that nearly anyone can use with relative ease. Digital cameras are available with user interfaces that enable a user to select various camera features for editing (e.g., red-eye removal) their photographs on the camera. However, advanced touch-up of the photo typically needs to be done on a personal computer using sophisticated software.

Photo-editing software is available for resizing digital images in two dimensions (e.g., along both the X and Y axes). However, this only makes the photo larger or smaller. Photo-editing software is also available which resizes digital images in only one dimension. However, these images may appear distorted so that it is obvious to the viewer that the photo has been altered.

DETAILED DESCRIPTION

Systems and methods are disclosed for creating a slimming effect for the subject (e.g., a person) in digital photographs. Exemplary systems may be implemented as an easy-to-use interface displayed on the digital camera and navigated by the user with conventional camera controls (e.g., arrow buttons and zoom levers already provided on the camera). The user needs little, if any, knowledge about photo-editing, and does not need special software for their PC to create the slimming effect. Various user options for creating the slimming effect are also available so that the desired slimming effect can be readily selected by the user from a plurality of predetermined settings directly on the camera itself.

Exemplary Systems

Figure 1:
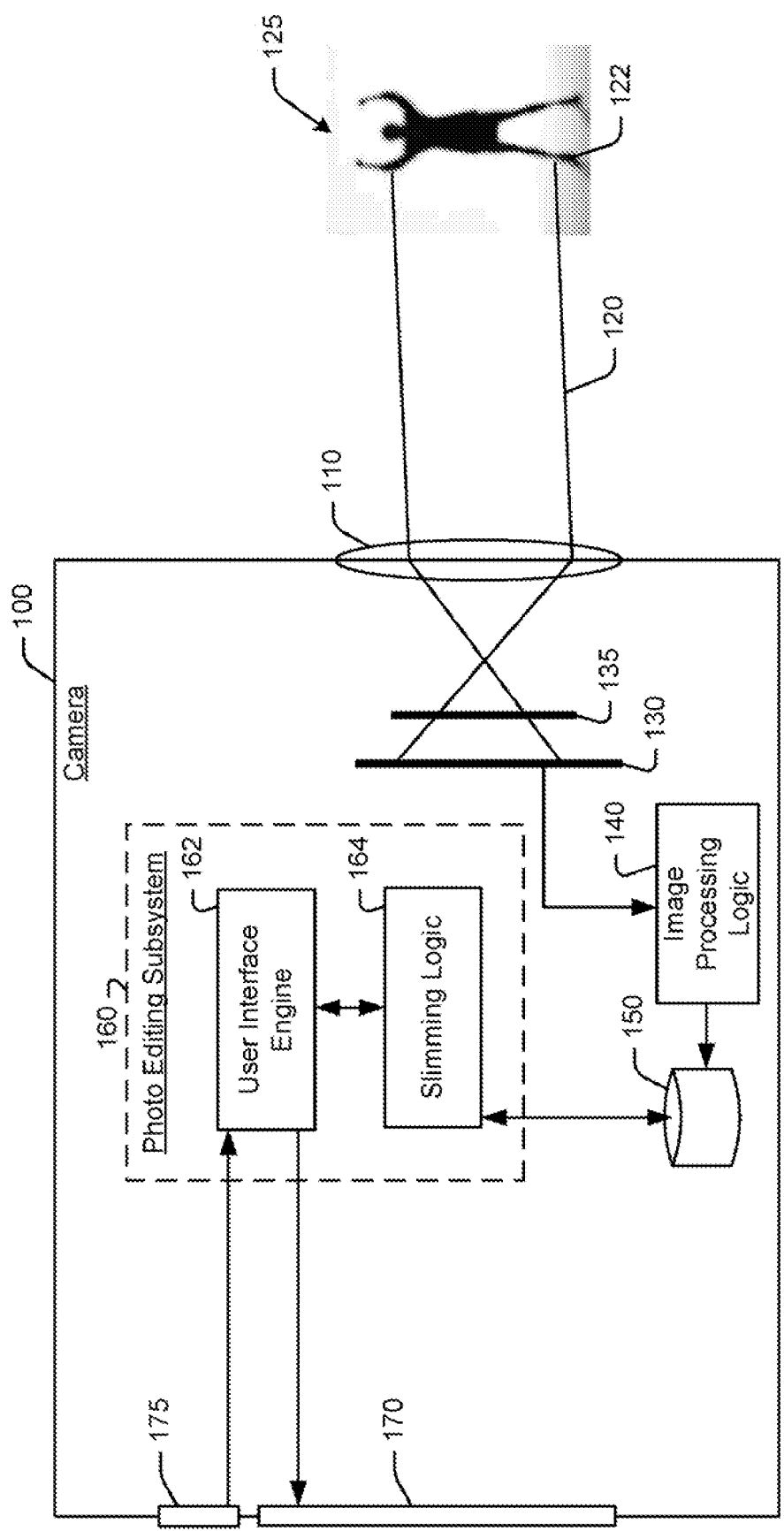
FIG. 1 is a block diagram of an exemplary camera system which may implement a slimming effect for digital photographs.

FIG. 1 is a block diagram of an exemplary camera system which may implement a slimming effect for digital photographs. The exemplary camera system 100 may be a digital camera including a lens 110 positioned to focus light 120 reflected from one or more objects 122 in a scene 125 onto an image capture device or image sensor 130 when a shutter 135 is open (e.g., for image exposure). Exemplary lens 110 may be any suitable lens which focuses light 120 reflected from the scene 125 onto image sensor 130.

Exemplary image sensor 130 may be implemented as a plurality of photosensitive cells, each of which builds-up or accumulates an electrical charge in response to exposure to light. The accumulated electrical charge for any given pixel is proportional to the intensity and duration of the light exposure. Exemplary image sensor 130 may include, but is not limited to, a charge-coupled device (CCD), or a complementary metal oxide semiconductor (CMOS) sensor.

Camera system 100 may also include image processing logic 140. In digital cameras, the image processing logic 140 receives electrical signals from the image sensor 130 representative of the light 120 captured by the image sensor 130 during exposure to generate a digital image of the scene 125. The digital image may be stored in the camera's memory 150 (e.g., a removable memory card).

Shutters, image sensors, memory, and image processing logic, such as those illustrated in FIG. 1, are well-understood in the camera and photography arts. These components may be readily provided for digital camera 100 by those having ordinary skill in the art after becoming familiar with the teachings herein, and therefore further description is not necessary.

Digital camera 100 may also include a photo-editing subsystem 160. In an exemplary embodiment, photo-editing subsystem 160 is implemented in program code (e.g., firmware and/or software) residing in memory on the digital camera 100 and executable by a processor in the digital camera 100, such as the memory and processor typically provided with commercially available digital cameras. The photo-editing subsystem 160 may include a user interface engine 162 and slimming logic 164.

The slimming logic 164 may be operatively associated with the memory 150 for accessing digital images (e.g., reading the images stored in memory 150 by image processing logic 140 or writing the images generated by the slimming logic 164). Slimming logic 164 may include program code for applying a slimming effect to the digital images stored on the camera system 100, as explained in more detail below. The slimming logic 164 may also be operatively associated with the user interface engine 162.

User interface engine 162 may be operatively associated with a display 170 and one or more camera controls 175 already provided on many commercially available digital cameras. Such an embodiment reduces manufacturing costs (e.g., by not having to provide additional hardware for implementing the photo-editing subsystem 160), and enhances usability by not overwhelming the user with additional camera buttons.

During operation, the user interface engine 162 displays a slimming effects menu on the digital camera (e.g., on display 170). In an exemplary embodiment, the effects menu may be accessed by a user selecting the "Design Gallery" menu option. The slimming effects menu may then be navigated by a user making selections from any of a variety of menus options. For example, the user interface engine 162 may receive input (e.g., via one or more of the camera controls 175) identifying user selection(s) from the slimming effects menu. The slimming logic 164 may then be implemented to apply a slimming effect to a digital image stored in the digital camera 100 (e.g., in memory 150) based on user selection(s) from the slimming effects menu.

A preview image may be displayed on display 170 so that the user can see the slimming effect. Optionally, instructive text may also be displayed on display 170 for modifying, or accepting/rejecting the slimming effect. The instructive text may be displayed until the user operates a camera control 175 (e.g., presses a button on the digital camera 100). After the user operates a camera control 175, the text may be removed so that the user can better see the preview image and slimming effect on display 170.

Also optionally, the user may operate camera controls 175 (e.g., as indicated by the instructive text) to modify the slimming effect. For example, the user may press the left/right arrow buttons on the digital camera 100 to increase or decrease the degree of compression used to create the slimming effect.

In an exemplary embodiment, a copy of the original digital photograph is used for applying the slimming effect. For example, the new image may be viewed by the user on display 170 directly after the original image so that the user can readily see both the original image and the modified image.

Before continuing, it is noted that the digital camera shown and described above with reference to FIG. 1 is merely exemplary of a camera system which may implement a slimming effect for digital photographs. The systems and methods described herein, however, are not intended to be limited only to use with the camera system 100. Other embodiments of camera systems which may implement a slimming effect for digital photographs are also contemplated.

Figure 2:
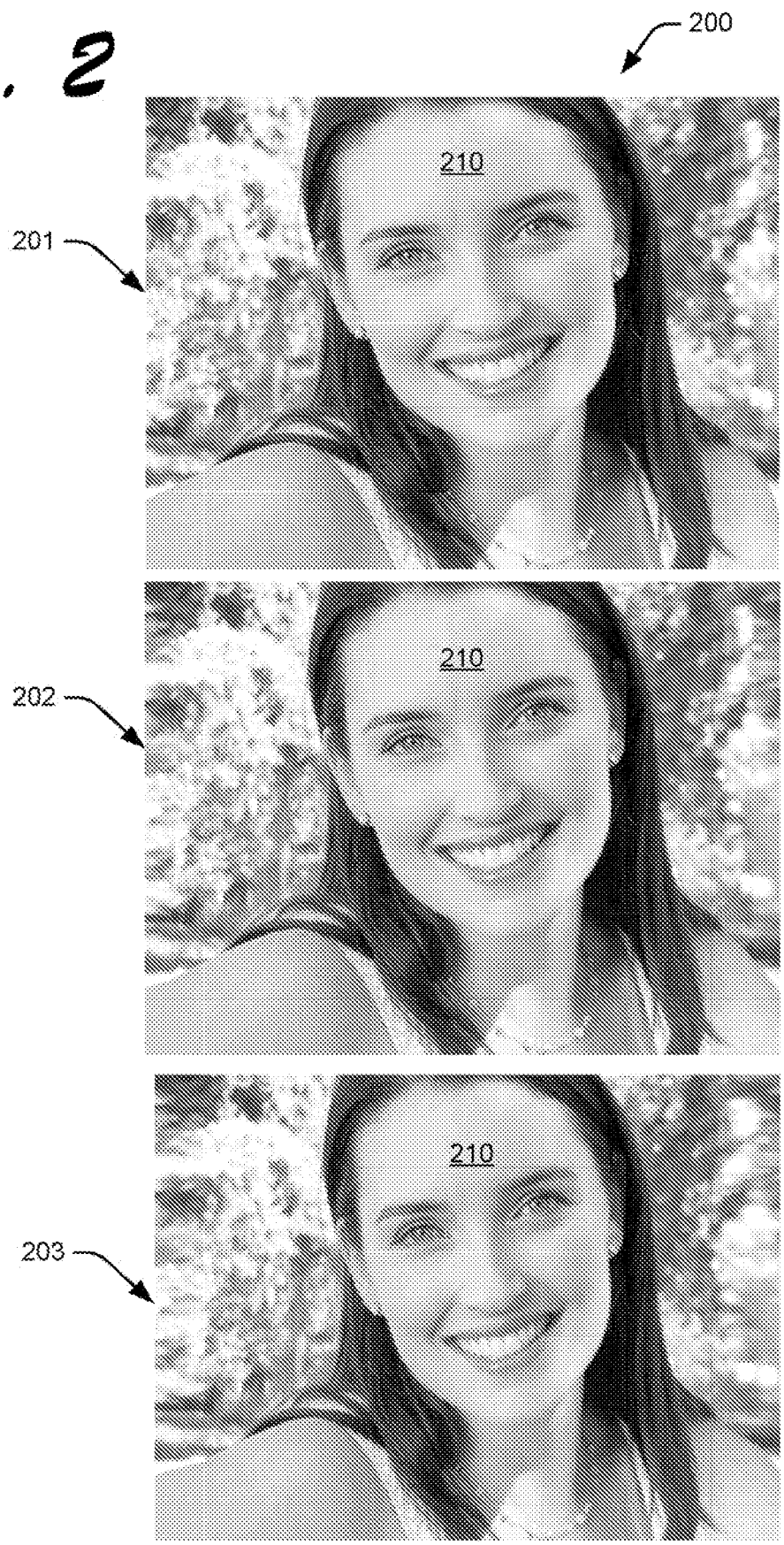
FIG. 2 shows exemplary digital photographs that illustrate a slimming effect.

FIG. 2 shows exemplary digital photographs 200 that illustrate a slimming effect, such as may be generated by the camera system 100 in FIG. 1. An original digital photograph 201 is shown with the subject 210 appearing as originally captured by the camera. The subject 210 of a photograph may be unhappy with his or her appearance in the digital photograph 201, e.g., commenting that "the camera makes them look heavier than they actually are." Accordingly, the camera user may apply implement the slimming effect on the original digital photograph 201.

In an exemplary embodiment, the camera user may select from options displayed on the user interface on the digital camera (e.g., camera system 100 in FIG. 1). The options may be preprogrammed to correspond to various amounts of compression of the digital image. Although the user may be prompted directly for the amount of compression, in order to make the interface more user-friendly, more general terminology may be displayed for the user. For example, the user may select between "thin," "thinner," and "thinnest."

It is noted that user-friendly selections corresponding to various amounts of compression simplifies the user interface and also reduces processing requirements and time to produce the slimming effect. Accordingly, the slimming effect can be readily implemented on an embedded system, such as the camera system 100 described above with reference to FIG. 1.

Of course other selections may also be implemented and are not limited to the user-friendly selections given above as examples. In other embodiments, a slider (e.g., the camera's zoom lever) or other user input may allow the user to select finer gradations for application of the slimming effect, such as, e.g., on a scale of 1 to 10. Although the user's selection may depend at least to some extent on the user's preferences, typically the user will want to select the degree of compression that makes the subject appear slimmer without making it obvious to a viewer that the digital photograph has been altered.

It is noted that the levels of compression may be optimized to perform well on the user interface system. For example smaller gradations may not be visible on the camera display. Accordingly, an implementation where the full resolution picture size is divided by the display size may be used to approximate gradations. For example, where the full resolution picture size is 1280 pixels and the display size is 320 pixels, pixels may be removed during compression in increments of at least 4 pixels on the large image to make the effect appear at the display size.

Digital photographs 202 and 203 illustrate application of the slimming effect to the original digital photograph 201. Digital photograph 202 is the result of applying a first slimming effect (e.g., "low") to the original digital photograph 201. Digital photograph 203 is the result of applying a second slimming effect (e.g., "medium") to the original digital photograph 201. It is readily observed that the subject 210 appears thinner in digital photographs 202 and 203. However, the aspect ratio of the original digital photograph 201 is maintained in both of the altered photographs 202 and 203 so that these do not appear altered. Exemplary embodiments for making the subject 210 appear thinner in the altered photographs 202 and 203 while retaining the aspect ratio of the original digital photograph 201 can be better understood with reference to the simplified illustrations described below with reference to FIGS. 3 and 4.

Figure 3:
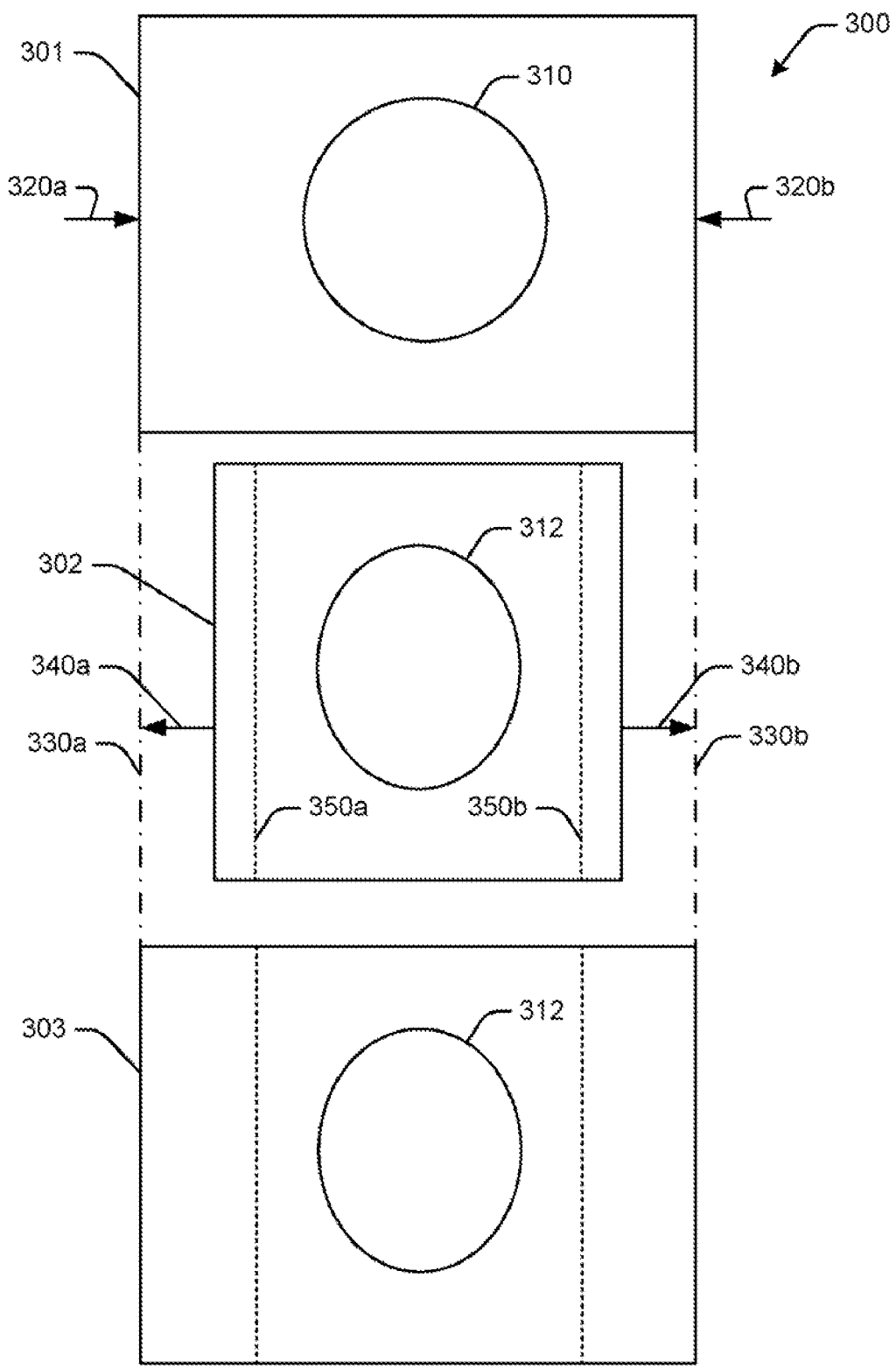
FIG. 3 shows simplified images illustrating an exemplary implementation for applying a slimming effect to a digital photograph.

FIG. 3 shows simplified images 300 illustrating an exemplary implementation for applying a slimming effect to a digital photograph. In FIG. 3, image 301 represents the original digital photograph, and the circle 310 represents the subject (e.g., the person 210 shown in the digital photograph 201 in FIG. 2).

If the user selects a slimming effect for the digital photograph 201, a compression algorithm executes on the camera (e.g., slimming logic 164 in camera system 100 shown in FIG. 1). The compression algorithm compresses the digital image 301 in one dimension, as illustrated by arrows 320a-b in FIG. 3. The amount of compression corresponds to the user's selection. For example, if the user selects "thinner," the digital photograph 201 may be compressed from 620 pixels wide to 580 pixels wide.

It is readily observed that the compressed subject 312 appears thinner in the compressed image 302. It is also apparent that the aspect ratio of the original digital photograph 301 is changed, as illustrated by lines 330a-b in FIG. 3. In order to maintain the aspect ratio of the original digital photograph 301, the compressed image 302 may be "stretched" in the opposite direction, as illustrated by arrows 340a-b.

Stretching the compressed image 302 to the original aspect ratio (e.g., from 580 pixels wide to 620 pixels wide) would cause the subject 312 to appear larger again, as in the original digital image 301. Instead, only a portion of the compressed image 302 is selected for stretching. In an exemplary embodiment, a portion on both sides of the compressed subject 312 is selected. This portion is illustrated in FIG. 3 as the portion laying between lines 350a-b and the outer edges of the compressed image 302.

Techniques for stretching (or up-sampling) a digital image are well-understood in the digital image arts. In an exemplary embodiment, stretching the digital image 302 may be accomplished by populating pixels in the stretched area with actual and/or estimated pixel values. For example, every other pixel (every third pixel, etc.) in the stretched area may be populated with the actual pixel values in the areas between the edges of the compressed image 302 and the lines 350a-b. The "missing" pixels may then be populated with pixel values from the pixels that are adjacent (or near-adjacent) the missing pixels. Optionally, techniques for averaging and/or blending may also be implemented for populating the pixel values in the stretched area. Alternatively, pixel values for the sides of the image may be stored in memory and retrieved when stretching the compressed image 302. Still other embodiments are also contemplated.

It can be readily observed that the compressed subject 312 still appears thinner in the stretched image 303. However, stretched image 303 has the same aspect ratio as the original digital photograph 401, as can be seen by lines 330*a-b* extending between the original digital photograph 301 and the stretched image 303, and the stretched image 303 does not appear to be altered.

Figure 4:
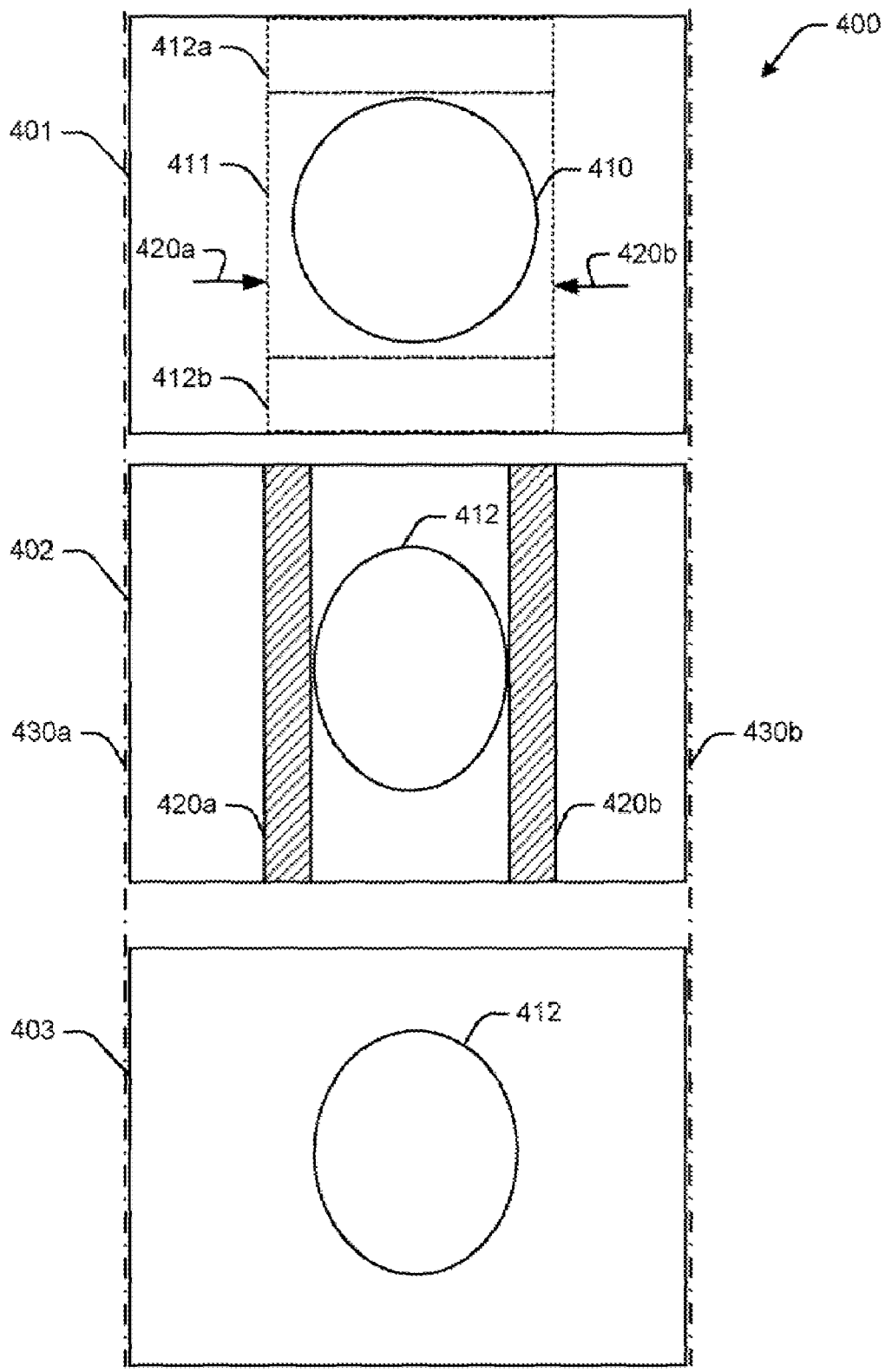
FIG. 4 shows simplified images illustrating another exemplary implementation for applying a slimming effect to a digital photograph.

FIG. 4 shows simplified images 400 illustrating another exemplary implementation for applying a slimming effect to a digital photograph. Again, image 401 represents the original digital photograph, and the circle 410 represents the subject (e.g., the person 210 shown in the digital photographs 200 in FIG. 2).

In the example shown in FIG. 4, a subject-recognition algorithm may be executed to identify the subject 410 of the digital image 401. The subject-recognition algorithm may receive user input to identify the subject 410. For example, the subject-recognition algorithm may display a box overlaid on the digital image 401 for the user to size and/or move around (e.g., using the up/down and right/left arrow buttons on the camera) on the digital photograph 410 being displayed on the camera. The subject-recognition algorithm then identifies the subject based on the user input. Alternatively, the subject-recognition algorithm may employ automated techniques for recognizing people in a digital image, e.g., based on facial recognition, skin recognition, etc.

Other embodiments are also contemplated. For example, a "what you see is what you get" (wysiwyg) algorithm enables the user move the area to be trimmed back and forth along the photo and pick the width of the selection. The user can then see a "ripple" in the image. In yet another example, the user may select the area to be slimmed by magnifying the selection.

In any event, the compression algorithm may then be executed to compress a subject area in the digital image 401. The "subject area" may be defined as a selected area 411 including at least the subject 410, and if present, a top area 412*a* and bottom area 412*b* relative to the selected area 411. The compression algorithm may then be executed to compress the subject area in only one dimension, as illustrated by arrows 420*a-b* in FIG. 4. The amount of compression corresponds to the user's selection (e.g., from 620 pixels wide to 580 pixels wide if the user selected "thinner").

It is apparent that the compressed subject 412 appears thinner in the compressed image 402. It is also apparent that there are missing pixels (illustrated by areas 420*a-b*) in the compressed image 402 following compression of the subject area. Accordingly, the digital image 402 may be "stretched" to populate the missing pixels 420*a-b* with pixel values.

Again, it can be readily observed that the compressed subject 412 still appears thinner in the stretched image 403. However, stretched image 403 has the same aspect ratio as the original digital photograph 401, as can be seen by lines 430*a-b* extending between the original digital photograph 401 and the stretched image 403, and the stretched image 403 does not appear to be altered.

Before continuing, it is noted that any of a wide variety of different algorithms may be implemented for the compression and stretching operations. In exemplary embodiments where the compression and stretching operations are being implemented on a digital camera, selection of these algorithms may depend at least to some extent on the processing and memory constraints of the camera system. Suitable compression and stretching algorithms for use on a digital camera system may include, by way of example, bi-linear, bi-cubic, nearest neighbor compression/decompression algorithms commonly used for resizing digital images. These and other algorithms now known or later developed may be implemented, as will be readily apparent to one having ordinary skill in the art after becoming familiar with the teachings herein.

It is also noted that if the user picks a portrait shot (meaning it was taken by turning the camera vertically) and selects slimming without first rotating the image, the person may appear larger. To accommodate this, the direction (vertically or horizontally) for applying the slimming effect may be selected for different camera orientations (e.g., portrait versus landscape mode). Some cameras are commercially available with a sensor that automatically rotates the image and puts black edges to the right and left. In these cameras, the slimming effect can be applied automatically based on feedback from the camera sensor. Other cameras do not have sensors for determining camera orientation. In these cameras, image recognition algorithms may be implemented, such as, e.g., face recognition, sky recognition, etc., to determine the image orientation for applying the slimming effect.

Exemplary Operations

Exemplary operations may be embodied as logic instructions on one or more computer-readable medium. When executed on a processor (e.g., in the camera), the logic instructions implement the described operations. In an exemplary embodiment, the components and connections depicted in the figures may be implemented.

Figure 5:
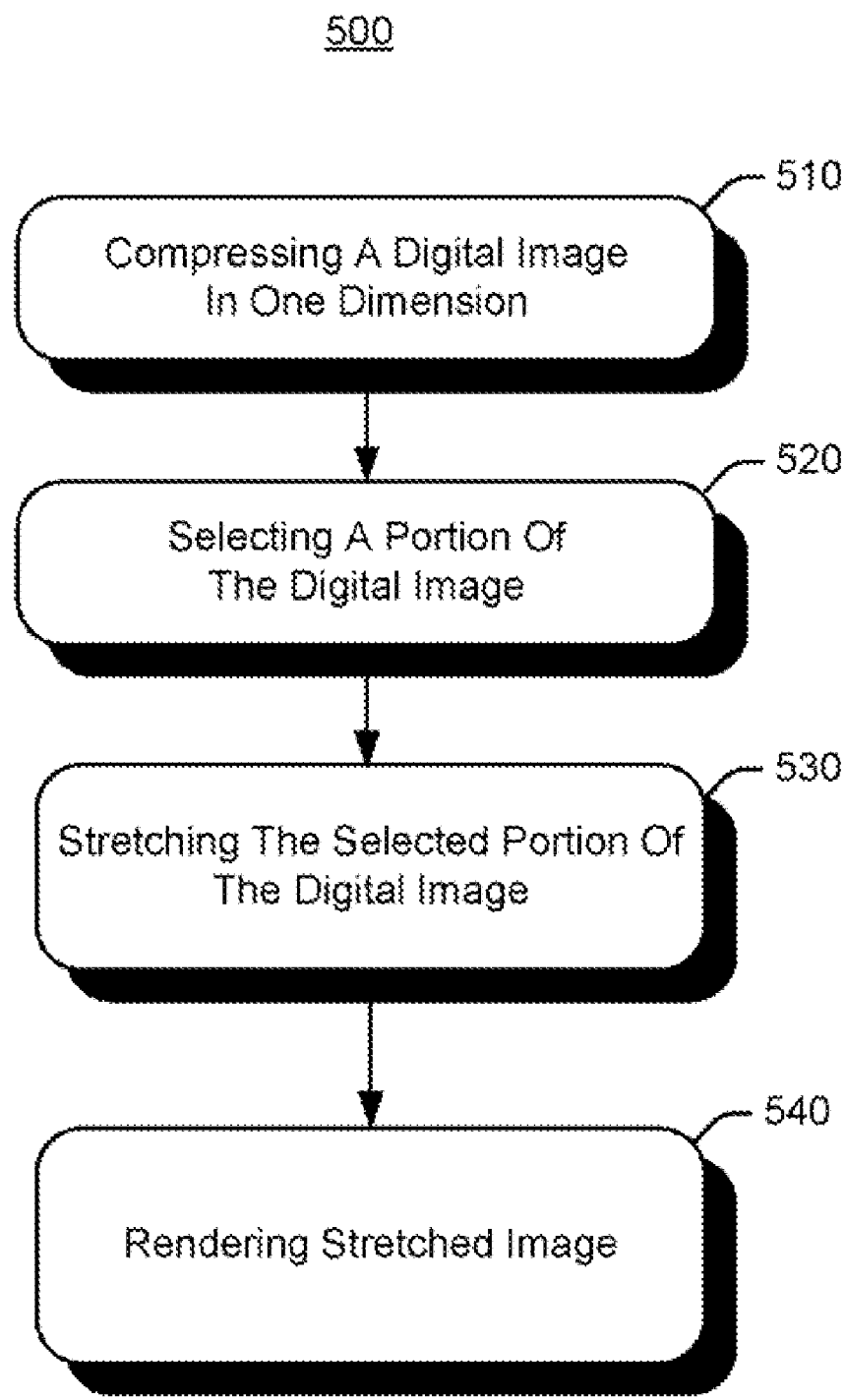
FIG. 5 is a flowchart illustrating exemplary operations to implement a slimming effect for digital photographs.

FIG. 5 is a flowchart illustrating exemplary operations 500 to implement a slimming effect for digital photographs. In operation 510, a digital photograph may be compressed in one dimension so that a subject in the digital photograph appears to be "thinner". In an exemplary embodiment, the entire digital photograph may be compressed, e.g., by downsampling or other suitable method. In another exemplary embodiment, only a subject area of the digital photograph may be compressed.

In operation 520, a portion of the compressed image is selected on both sides of the subject. For example, the outermost 10% (5%, 20%, etc.) on both sides of the digital image may be selected. Or for example, the portion of the compressed image which does not contain the subject may be selected. In operation 530, only the selected portion of the compressed image is stretched. For example, the selected portion of the compressed image may be stretched by up-sampling or other suitable method.

In operation 540, the stretched image is rendered with a subject that appears thinner than in the original digital image, while retaining substantially the same aspect ratio as the original digital photograph. Accordingly, the subject is pleased with his or her "thinner" appearance and the stretched image does not appear to be altered.

In another exemplary embodiment, the user may select a region of the image to slim, and an amount to slim the selected region. The slimming algorithm compresses the entire original image, and separately stretches the edges of the original image an amount corresponding to the necessary replacement of the lost dimensions in the compressed image. The slimmed image and the stretched edges are then combined. Such an implementation results in less replication (or up-sampling).

Figure 6:
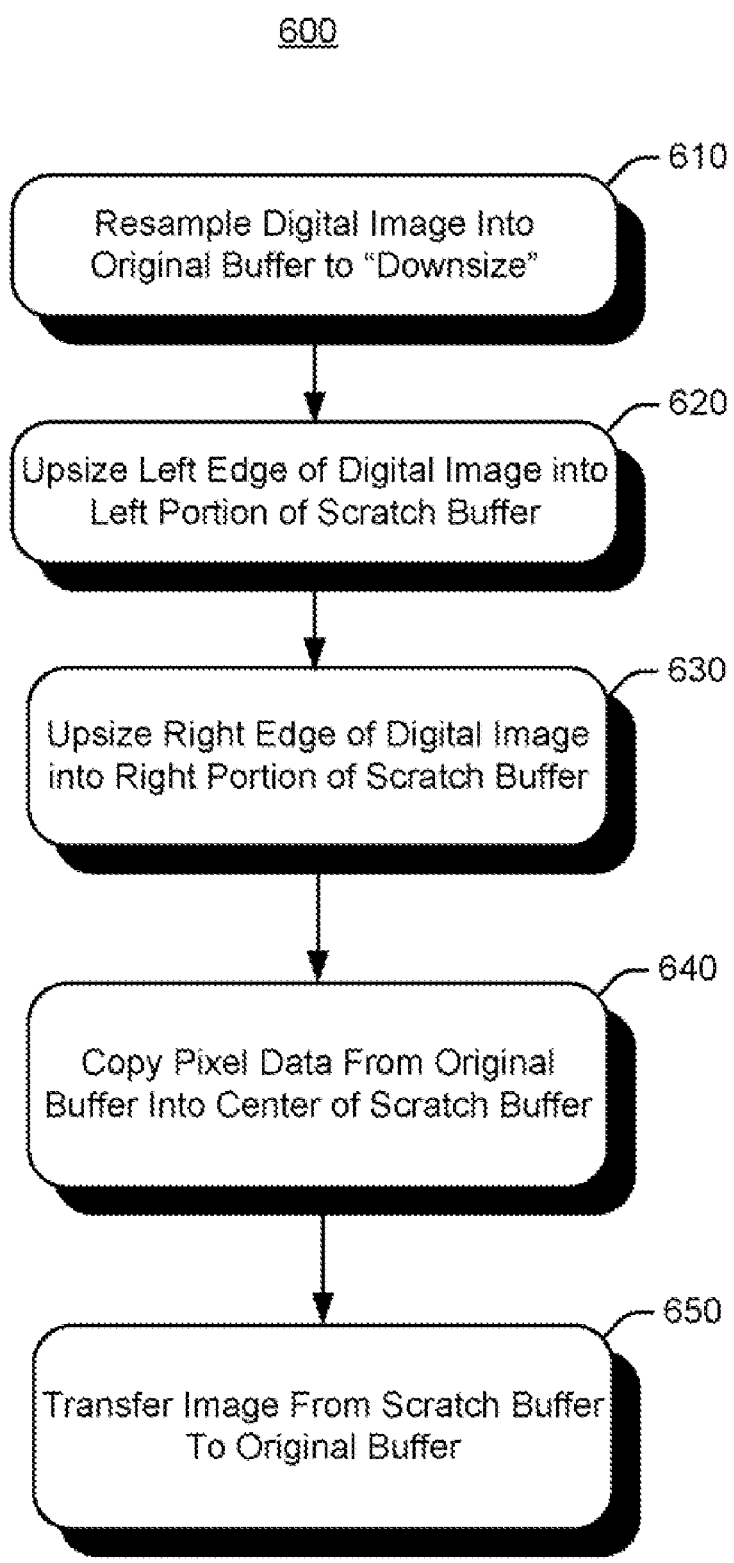
FIG. 6 is a flowchart illustrating exemplary operations for compressing and stretching a digital image to implement a slimming effect for digital photographs.

FIG. 6 is a flowchart illustrating exemplary operations 600 for compressing and stretching a digital image to implement a slimming effect for digital photographs. It is noted that operations 600 are one possible example for implementing operations 530 and 540 discussed above with reference to FIG. 5, but are not intended to be limiting.

In operation 610, an entire digital image may be downsized by re-sampling the image into the original buffer in the camera's memory system. For example, the entire digital image in buffer "A" may be re-sampled back into the same buffer "A" in the camera's memory system. Well-known nearest-neighbor, bi-cubic, or bi-linear (or other) algorithms may be executed to downsize the image.

In operation 620, a left edge of the original digital image is upsized into the left portion of a scratch buffer. In operation 630, a right edge of the original digital image is upsized into the right portion of a scratch buffer. Of course the ordering of operations 620 and 630 may be reversed or accomplished simultaneously. Again, well-known nearest-neighbor, bi-cubic, or bi-linear (or other) algorithms may be executed for the upsizing operations 620, 630.

In operation 640, pixel data from the original buffer (e.g., buffer "A") comprising the "slimmed" portion of the original digital image is copied into the center portion of the scratch buffer. In operation 650, the "slimmed" image is transferred from the scratch buffer back to the original buffer (e.g., buffer "A").

It is noted that the exemplary embodiments shown and described are provided for purposes of illustration and are not intended to be limiting. Still other embodiments for implementing a slimming effect for digital photographs are also contemplated.

The invention claimed is:

1. A digital camera system including computer-readable storage and a processor for storing and executing logic, comprising:
   computer-readable storage for storing an original digital image in the digital camera;
   slimming logic executable in the digital camera to produce a slimming effect on a subject in the original digital image by:
   selecting a subject area of the original digital image, the subject area including an upper portion extending substantially to a top edge of the original digital image and a lower portion extending substantially to a bottom edge of the original digital image;
   compressing all of the subject area of the original digital image in only one dimension, while leaving a portion on each side of the compressed image uncompressed; and
   stretching only the uncompressed portion on each side of the compressed image while retaining the slimming effect on the subject area.

2. The digital camera system of claim 1, wherein the stretched image has an aspect ratio substantially the same as an aspect ratio of the original digital image.

3. The digital camera system of claim 1, further comprising a user interface engine for receiving user input indicating an amount of the slimming effect to apply.

4. The digital camera system of claim 3, wherein the amount of the slimming effect to apply corresponds to a predetermined degree of compression, the predetermined degree of compression not being infinitely selectable by the user, thereby reducing processing requirements and time to produce the slimming effect.

5. The digital camera system of claim 1, further comprising subject-recognition logic to identify the subject area in the original digital image.

6. The digital camera system of claim 1, wherein the slimming logic down-samples the original digital image to produce the compressed image.

7. The digital camera system of claim 1, wherein the slimming logic up-samples the original digital image to produced the stretched image.

8. A method of applying a slimming effect to a digital image on a camera comprising:
   compressing the digital image in one dimension so that a subject appears thinner;
   selecting a portion of the compressed image on both sides of the subject; and
   stretching only the selected portion of the compressed image to retain an aspect ratio of the original digital image; and
   wherein the steps of compressing and stretching further include:
   re-sampling the digital image into an original buffer in the camera's memory system;
   upsizing a left-most edge into a left-most portion of a scratch buffer in the camera's memory system;
   upsizing a right-most edge into a right-most portion of a scratch buffer in the camera's memory system;
   copy pixel data from the original buffer into a center portion of the scratch buffer; and
   transferring a compressed and stretched image from the scratch buffer into the original buffer.

9. The method of claim 8, further comprising applying the slimming effect only to a copy of the digital image.

10. The method of claim 8, further comprising increasing or decreasing the slimming effect on a preview image based on user input to the camera.

11. The method of claim 8, further comprising identifying a subject area in the digital image and only compressing the subject area.

12. The method of claim 8, further comprising displaying user-friendly slimming effects language for a user of the camera, the user-friendly slimming effects language corresponding to predetermined amounts of compression.

13. The method of claim 8, further comprising automatically identifying a direction for applying the slimming effect based on camera orientation.

14. The method of claim 8, wherein the step of compressing and the step of stretching are executed separately on the same image and then the compressed and stretched images are combined to render the digital image with the slimming effect.

15. A computer program product stored on computer-readable storage and encoding computer programs executable by a processor for producing a slimming effect for a subject in a digital image, the computer process comprising executable program code for:
   automatically identifying a subject area in an original digital image, the subject area including an upper portion extending to a top edge of the original digital image and a lower portion extending to a bottom edge of the original digital image;
   compressing the entire subject area of the original digital image in one dimension to produce a slimming effect on the subject area, while leaving a portion on each side of the compressed image uncompressed;
   selecting the uncompressed portion of the compressed image outside of the subject area;
   stretching only the selected portion of the compressed image; and
   retaining the slimming effect on the subject area in the stretched image while retaining an aspect ratio of the original digital image.

16. The computer program product of claim 15, further comprising executable program code for generating a preview image with the slimming effect to display for a user.

17. The computer program product of claim 16, further comprising executable program code for increasing or decreasing the slimming effect on the preview image based on user input to the camera.

18. The computer program product of claim 15, further comprising executable program code for compressing only the subject area.

19. A system embedded in a camera for producing a slimming effect, comprising:
- means for selecting a subject area, the subject area including an upper portion extending to a top edge of an original digital image and a lower portion extending to a bottom edge of the original digital image;
- means for compressing the entire subject area of the digital image in one dimension, while leaving a portion on each side of the compressed image uncompressed;
- means for selecting the portion of the uncompressed image;
- means for stretching only the selected portion of the uncompressed image while leaving a subject compressed.

20. The system of claim 19, further comprising means for identifying a subject area in a digital image.

21. The system of claim 19, further comprising means for rendering the stretched image with an aspect ratio substantially the same as an aspect ratio of the original digital image.

22. The digital camera system of claim 1, wherein the slimming logic stretching only a portion on each side of the compressed image comprises averaging and blending pixel values from only the portion of each side of the image of the compressed image.

23. A digital camera system including computer-readable storage and a processor for storing and executing logic, comprising:
- computer-readable storage for storing an original digital image in the digital camera;
- slimming logic executing in the digital camera to automatically produce a slimming effect on a subject in the original digital image, the slimming logic:
- compressing the original digital image in only one dimension;
- stretching only a portion on each side of the compressed image while retaining the slimming effect on the subject; and
- rendering the stretched image.

24. The digital camera system of claim 23, the slimming logic further to execute in response to receiving a user request to automatically produce the slimming effect in the original digital image.

* * * * *